US012797908B2

(12) United States Patent
Bucci et al.

(10) Patent No.: US 12,797,908 B2
(45) Date of Patent: Nov. 17, 2026

(54) LOTTERY TICKET VENDING MACHINE WITH CLEANING PAD DRAWER

(71) Applicant: Brightstar Global Solutions Corporation, Providence, RI (US)

(72) Inventors: Paul A. Bucci, Glocester, RI (US); Thomas Quaranta, North Kingstown, RI (US); Stewart Thoeni, Reno, NV (US)

(73) Assignee: Brightstar Global Solutions Corporation, Providence, RI (US)

( * ) Notice: Subject to any disclaimer, the term of this patent is extended or adjusted under 35 U.S.C. 154(b) by 343 days.

(21) Appl. No.: 18/737,438

(22) Filed: Jun. 7, 2024

(65) Prior Publication Data

US 2025/0375797 A1 Dec. 11, 2025

(51) Int. Cl.

| | |
|---|---|
| ***B08B 1/14*** | (2024.01) |
| ***A63F 3/06*** | (2006.01) |
| ***B08B 1/30*** | (2024.01) |
| ***B08B 13/00*** | (2006.01) |
| ***G07F 17/42*** | (2006.01) |

(52) U.S. Cl.

CPC ................ *B08B 1/143* (2024.01); *B08B 1/30* (2024.01); *B08B 13/00* (2013.01); *G07F 17/42* (2013.01); *A63F 3/0665* (2013.01)

(58) Field of Classification Search

CPC ........... B08B 1/143; B08B 1/30; B08B 13/00; G07F 17/42; G07F 17/329; A63F 3/0665; A63F 3/068

See application file for complete search history.

(56) References Cited

U.S. PATENT DOCUMENTS

| | | | |
|---|---|---|---|
| 3,855,457 A | 12/1974 | Amundson et al. | |
| 5,222,624 A | 6/1993 | Burr | |
| 5,408,417 A | 4/1995 | Wilder | |
| 5,836,498 A | 11/1998 | Turek | |
| 6,609,644 B1 | 8/2003 | Menna | |
| 6,712,253 B2 | 3/2004 | Hargrave et al. | |
| 6,714,838 B2 | 3/2004 | Scrymgeour et al. | |
| 6,726,077 B2 | 4/2004 | Roberts et al. | |
| 7,032,774 B2 | 4/2006 | Boehm et al. | |
| 7,383,099 B2 | 6/2008 | Pollard et al. | |
| 7,562,798 B2 | 7/2009 | Bartolone et al. | |
| 7,665,394 B2 | 2/2010 | Roberts et al. | |
| 7,850,257 B2 | 12/2010 | Roberts et al. | |
| 8,127,973 B2 | 3/2012 | Mirkovic et al. | |
| 8,192,268 B1 * | 6/2012 | Karpe .................. | G07F 17/329 463/16 |
| 8,210,921 B1 | 7/2012 | Karpe | |
| 8,534,524 B2 | 9/2013 | Businger et al. | |

(Continued)

*Primary Examiner* — Michael Collins

(74) *Attorney, Agent, or Firm* — Neal, Gerber & Eisenberg LLP

(57) ABSTRACT

A lottery ticket vending machine including a housing, a ticket drawer holder in the housing, the ticket drawer holder including a plurality of ticket drawers and a cleaning pad drawer, each of the plurality of ticket drawers configured to hold a plurality of lottery tickets, the cleaning pad drawer configured to hold a cleaning pad, and a ticket burster in the housing, the ticket burster configured to move to a cleaning pad receipt position associated with and in alignment with the cleaning pad drawer, and receive a cleaning pad from the cleaning pad drawer to clean a part of the ticket burster.

20 Claims, 10 Drawing Sheets

(56) References Cited

U.S. PATENT DOCUMENTS

| | | | | |
|---|---|---|---|---|
| 8,550,294 | B2 | 10/2013 | Martin | |
| 9,613,337 | B1 | 4/2017 | Garrison | |
| 9,685,026 | B1 | 6/2017 | Garrison | |
| 10,438,452 | B2 | 10/2019 | Ferron et al. | |
| 11,010,987 | B2 | 5/2021 | Bucci | |
| 12,646,388 | B2 * | 6/2026 | Bucci | G07F 11/045 |
| 2003/0120381 | A1 | 6/2003 | Perin et al. | |
| 2004/0000572 | A1 | 1/2004 | Engelhardt, Jr. et al. | |
| 2005/0178810 | A1 | 8/2005 | Woods et al. | |
| 2007/0017978 | A1 | 1/2007 | Ho | |
| 2007/0088459 | A1 | 4/2007 | Pollard et al. | |
| 2010/0308071 | A1 | 12/2010 | Businger | |
| 2014/0008407 | A1 | 1/2014 | Bucci et al. | |
| 2016/0232741 | A1 | 8/2016 | Assis et al. | |
| 2019/0043319 | A1 * | 2/2019 | Lavoie | G07F 17/329 |
| 2022/0108562 | A1 | 4/2022 | Claude et al. | |
| 2022/0114842 | A1 | 4/2022 | Mejenborg et al. | |
| 2022/0114860 | A1 | 4/2022 | Mejenborg et al. | |
| 2024/0021054 | A1 * | 1/2024 | Topalian | G07F 17/329 |
| 2025/0111756 | A1 * | 4/2025 | Thoeni | G07F 17/329 |
| 2025/0375797 | A1 * | 12/2025 | Bucci | B08B 1/143 |
| 2026/0045150 | A1 * | 2/2026 | Topalian | G07F 17/329 |

* cited by examiner

LOTTERY TICKET VENDING MACHINE WITH CLEANING PAD DRAWER

BACKGROUND

The present disclosure relates to lottery ticket vending machines.

Lottery tickets such as instant lottery tickets may be printed on a strip that may be rolled or fan-folded and provided as a pack of lottery tickets. Lottery tickets in such strips may be separated along perforations formed between adjacent tickets in the strips. Lottery tickets may vary in width and length. Lottery tickets may be sold from such packs using lottery ticket vending machines.

BRIEF SUMMARY

In various embodiments, the present disclosure relates to a lottery ticket vending machine including a housing, a ticket drawer holder in the housing, and a ticket burster in the housing. The ticket drawer holder includes a plurality of ticket drawers and a cleaning pad drawer. Each of the plurality of ticket drawers is configured to hold a plurality of lottery tickets. The cleaning pad drawer is configured to hold a cleaning pad. The ticket burster is configured to move to a cleaning pad receipt position associated with and in alignment with the cleaning pad drawer, and receive the cleaning pad from the cleaning pad drawer to clean a part of the ticket burster.

In various other embodiments, the present disclosure relates to a lottery ticket vending machine including a housing, a ticket drawer holder in the housing, and a ticket burster in the housing. The ticket drawer holder includes a plurality of ticket drawers and a cleaning pad drawer. Each of the plurality of ticket drawers is configured to hold a plurality of lottery tickets. The cleaning pad drawer is configured to hold a cleaning pad. The ticket burster defines a ticket inlet, a scan region, and a ticket outlet. The ticket burster includes a barcode reader configured to read barcode data based on barcodes of lottery tickets that move into the ticket burster via the ticket inlet and through the scan region. The ticket burster is movable to a plurality of different ticket receipt positions, each of the plurality of different ticket receipt positions associated with and in alignment with a different one of the plurality of ticket drawers. The ticket burster is configured to receive in each of the plurality of different ticket receipt positions and via the ticket inlet a lottery ticket attached to a next lottery ticket from the ticket drawer associated with that ticket receipt position, separate the lottery ticket from the next lottery ticket, move the lottery ticket through the scan region, and dispense the lottery ticket via the ticket outlet. The ticket burster is also configured to move to a cleaning pad receipt position associated with and in alignment with the cleaning pad drawer, receive in the cleaning pad receipt position and via the ticket inlet the cleaning pad from the cleaning pad drawer, and perform a cleaning operation to clean the scan region by moving the cleaning pad through the scan region.

In various embodiments, the present disclosure relates to a lottery ticket vending machine including a housing, a ticket drawer holder in the housing, and a ticket burster in the housing. The ticket drawer holder includes a plurality of ticket drawers and a cleaning pad drawer. Each of the plurality of ticket drawers is configured to hold a plurality of lottery tickets. The cleaning pad drawer is configured to hold a plurality of cleaning pad. The ticket burster defines a ticket inlet, a scan region, and a ticket outlet. The ticket burster includes a barcode reader configured to read barcode data based on barcodes of lottery tickets that move into the ticket burster via the ticket inlet and through the scan region. The ticket burster is movable to a plurality of different ticket receipt positions, each of the plurality of different ticket receipt positions associated with and in alignment with a different one of the plurality of ticket drawers, and configured to: receive in each of the plurality of different ticket receipt positions and via the ticket inlet a lottery ticket attached to a next lottery ticket from the ticket drawer associated with that ticket receipt position, separate the lottery ticket from the next lottery ticket, and move the lottery ticket through the scan region, and dispense the lottery ticket via the ticket outlet. The ticket burster is configured to move to a cleaning pad receipt position associated with and in alignment with the cleaning pad drawer, receive in the cleaning pad receipt position and via the ticket inlet a cleaning pad from the cleaning pad drawer, cause the cleaning pad to be separated from a next cleaning pad of the plurality of cleaning pads, perform a cleaning operation to clean the scan region by moving the cleaning pad through the scan region, and move the cleaning pad out of the ticket burster via the ticket outlet.

Additional features are described in, and will be apparent from, the following Detailed Description and the figures.

DETAILED DESCRIPTION

Figure 1:
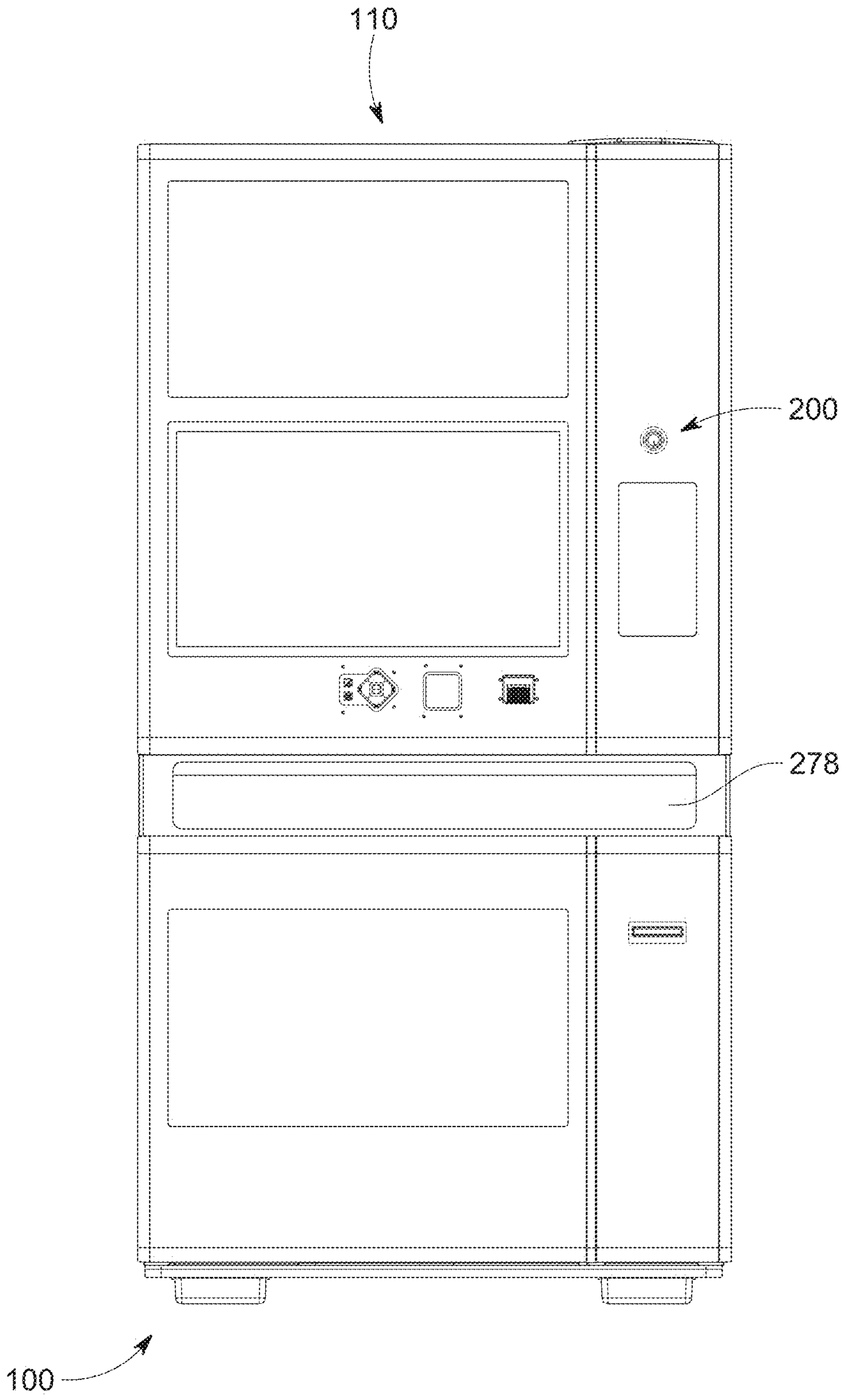
FIG. 1 is a front perspective view of a lottery ticket vending machine of one example embodiment of the present disclosure shown with a front door thereof in a closed position.

In various embodiments, the present disclosure relates to a lottery ticket vending machine that includes one or more ticket bursters, one or more ticket drawers, and one or more cleaning pad drawers, and that is configured to: (1) dispense a cleaning pad from one of the cleaning pad drawers into one of the ticket bursters, and (2) move the cleaning pad through a scan region of that ticket burster to remove dust and/or other contaminants from the scan region of that ticket burster. In various embodiments, the present disclosure is thus also related to a method of cleaning a ticket burster of a lottery ticket vending machine, wherein the method includes: (1) dispensing a cleaning pad from a cleaning pad drawer into a ticket burster, and (2) moving the cleaning pad through a scan region of that ticket burster to remove dust and/or other contaminants from the scan region of that ticket burster.

In various embodiments, each of the ticket bursters of the lottery ticket vending machine includes one or more suitable barcode readers and one or more ticket cutters. In such embodiments, the barcode reader(s) is/are configured to: (1) read a barcode on each lottery ticket as that lottery ticket moves through one or more scan regions of the ticket burster, and (2) the ticket cutter(s) is/are configured to separate each lottery ticket received in such ticket burster from a next lottery ticket received from a ticket drawer. The barcode reader(s) is/are configured to provide barcode related data to one or more controllers of the lottery ticket vending machine. In various such embodiments, the one or more controllers are configured to receive the barcode related data from the barcode readers and analyze such barcode related data to determine information regarding the lottery ticket.

In various embodiments, the one or more controllers are configured to cause regularly scheduled cleaning of the ticket bursters. In various embodiments, the controller(s) is/are configured to cause the ticket burster to perform a cleaning operation at particular time intervals (such as but not limited to a daily interval, on a weekly interval, and/or on a monthly interval). In various embodiments, the controller(s) is/are configured to cause the ticket burster to perform the cleaning operation at a particular time of day, for example, a time at which the lottery ticket vending machine is less likely to be utilized (such as but not limited to 3:00 am). In various embodiments, the controller(s) is/are configured to cause the ticket burster to perform a cleaning operation based on a quantity of lottery tickets dispensed by the lottery ticket vending machine (e.g., after every 100 dispensed lottery tickets). In various embodiments, the controller(s) is/are configured to signal a burster cleaning condition to the ticket burster to cause the ticket burster to perform the cleaning operation.

In various embodiments, the ticket burster is configured to, responsive to a burster cleaning condition, perform the cleaning operation: (1) move the ticket burster into alignment with a cleaning pad drawer; (2) obtain a cleaning pad from the cleaning pad drawer; and (3) move the cleaning pad through the scan region(s) of the ticket burster to clean the scan region(s). In various embodiments, the ticket burster is configured to, for the cleaning operation, eject the cleaning pad from such ticket burster. In various embodiments, the ticket burster is configured to, for the cleaning operation, cause the cleaning pad to be retracted back into the cleaning pad drawer for subsequent use.

For a better understanding of the present disclosure, example instant lottery tickets are first generally described herein.

Various known instant lottery tickets are single game instant lottery tickets. An example single game instant lottery ticket can include: (1) a ticket substrate having a front surface and a back surface; (2) a predefined scratch-off area on the front surface; (3) variable lottery game indicia printed on the predefined scratch-off area; (4) a scratch-off coating ("SOC") covering the variable lottery game indicia and the predefined scratch-off area; and (5) variable instant lottery ticket information indicia printed on the back surface. The instant lottery ticket information indicia can include text, one or more ticket numbers, one or more ticket barcodes, and other instant lottery ticket information that is in human readable and machine readable forms. Certain of this instant lottery ticket information: (a) identifies the instant lottery ticket; (b) the set, run, and/or pack of instant lottery tickets that the instant lottery ticket is part of; and (c) other inventory control information.

For each instant lottery ticket of a lottery game, each printed lottery ticket includes a barcode in the exact same location on the substrate of each instant lottery ticket. The barcodes are different because they each identify the specific instant lottery ticket.

Instant lottery tickets can have a width that varies from 2 to 4 inches and a length that varies from 2 to 12 inches. The term lottery ticket as used herein is intended to cover these various different types and other types of lottery tickets that can be dispensed in a same or similar manner as these types of lottery tickets.

Various lottery tickets are often arranged after manufacture (which includes after complete printing) in lottery ticket packs for storage, organization, sorting, picking, shipping to lottery ticket distributors or ticket retailers, and validation. Instant lottery ticket packs can include a plurality of lottery tickets that are all of the same type, same size, and for the same game(s), and can be protected for storage and shipping by a transparent pack wrapping, such as transparent plastic wrapping, securely wrapped around the plurality of lottery tickets. A pack of lottery tickets can include all of the lottery tickets attached to each other but joined by perforations. Such lottery tickets of a pack can be detached from each other along such perforations. While lottery tickets of each pack are often manufactured in a continuous strip that is fan-folded for convenient supply, the packs can be in other forms such as in a roll form. These packs in the fan-folded form or in the roll form are configured to be dispensed via a lottery ticket vending machine.

Lottery ticket vending machines can include various components such as but not limited to pinch rollers, stepper motors, and cutting blades to separate and dispense lottery tickets from a pack of lottery tickets. One issue with these components is dust and/or other contaminants can build up around and adjacent to these components and on adjacent components. These contaminants can cause lottery ticket scanning issues, such as obstruction of a view of part or all the barcodes on instant lottery tickets by the barcode reader. For example, the ticket burster can create contaminants when the cutting blades thereof cut a perforation between adjacent instant lottery tickets. These contaminants can spread throughout the ticket burster such as along a ticket movement path of the ticket burster. Such contaminants can settle into areas in and/or near a scan region of the barcode reader of the ticket burster and clump together, creating a visual obstruction within the scan region, specifically, between a barcode on the lottery ticket and the barcode reader, which can impede a scanning ability of the barcode reader.

To address these issues, various embodiments of the present disclosure provide a lottery ticket vending machine that uses one or more cleaning pad drawers that hold cleaning pads (such as described below) to remove dust and/or other contaminants from ticket bursters of the lottery ticket vending machine by moving the cleaning pads through respective ticket movement paths of the ticket bursters.

Turning now to FIGS. 1, 2, 3, 4, 5, 6, 7, 8, and 10 a lottery ticket vending machine 100 and cleaning pad of one example embodiment of the present disclosure are generally illustrated. The lottery ticket vending machine 100 may be referred to herein as the "ticket vending machine" or the "vending machine" for brevity.

The illustrated example ticket vending machine 100 includes: (a) a machine housing 110 including a front door 200; (b) three ticket drawer holders 300*a*, 300*b*, and 300*c* positioned in and supported by the machine housing 110; and (c) three separate and independently movable ticket bursters 400*a*, 400*b*, and 400*c* positioned in the machine housing 110 and supported by burster supports (not labeled) positioned in and supported by the machine housing 110. The front door 200 includes a ticket collection receptacle 250 configured to receive separated lottery tickets from each of the ticket bursters 400*a*, 400*b*, and 400*c* and a rejection area 260 configured to receive cleaning pads and/or lottery tickets deemed to be bad or non-dispensable for any reason. The quantity, positions, sizes, and configurations of the ticket drawer holders and the ticket bursters can vary in accordance with the present disclosure.

It should be appreciated that the ticket vending machine 100 includes various other components that are conventional in the industry and/or that would be readily apparent to those of ordinary skill in the art. For example, the ticket vending machine 100 can include: (1) various electronic components (not shown) some of which can be contained in an electronic component holder (not labeled) positioned in and supported by the machine housing 110; and (2) various purchaser interface components (not labeled) that are part of the front door 200 of the machine housing 110. These components are only briefly described herein for brevity. Such electronic components can be arranged in any suitable manner. The electronic component holder can be in the form of a slide-out drawer to facilitate access to the various electronic components contained therein. The electronic components can form part of the control system for the ticket vending machine 100. Various electronic components can also be positioned in the machine housing 110 outside of the electrical component holder. The electronic components can include one or more controllers that control the operation of the ticket vending machine 100 including the movable ticket bursters 400*a*, 400*b*, and 400*c* as further discussed herein to facilitate the dispensing of each requested lottery ticket and the determination of any position issues of the lottery tickets (such as further described below). The controller(s) can be any suitable type of controller (such as a programmable logic controller) that includes any suitable processing device(s) (such as a microprocessor, a microcontroller-based platform, an integrated circuit, or an application-specific integrated circuit) and any suitable memory device(s) (such as random access memory, read-only memory, or flash memory). The memory device(s) store(s) instructions executable by the processing device(s) to control operation of the ticket vending machine 100. The purchaser interface components include one or more display devices, one or more input devices, and one or more payment acceptors. The purchaser interface components enable purchasers to use such components to determine the lottery tickets available from the ticket vending machine 100, and to select and pay for any of those lottery tickets held by the ticket vending machine 100 that the purchaser desires to obtain. The purchaser interface components can display images and information to inform purchasers of the different lottery tickets available from the ticket vending machine 100 and to assist in completing the selection and purchase of such lottery tickets. These electronic components and purchaser interface components can take many different forms as well known in the industry, and are thus not described in detail herein for brevity.

Figure 2:
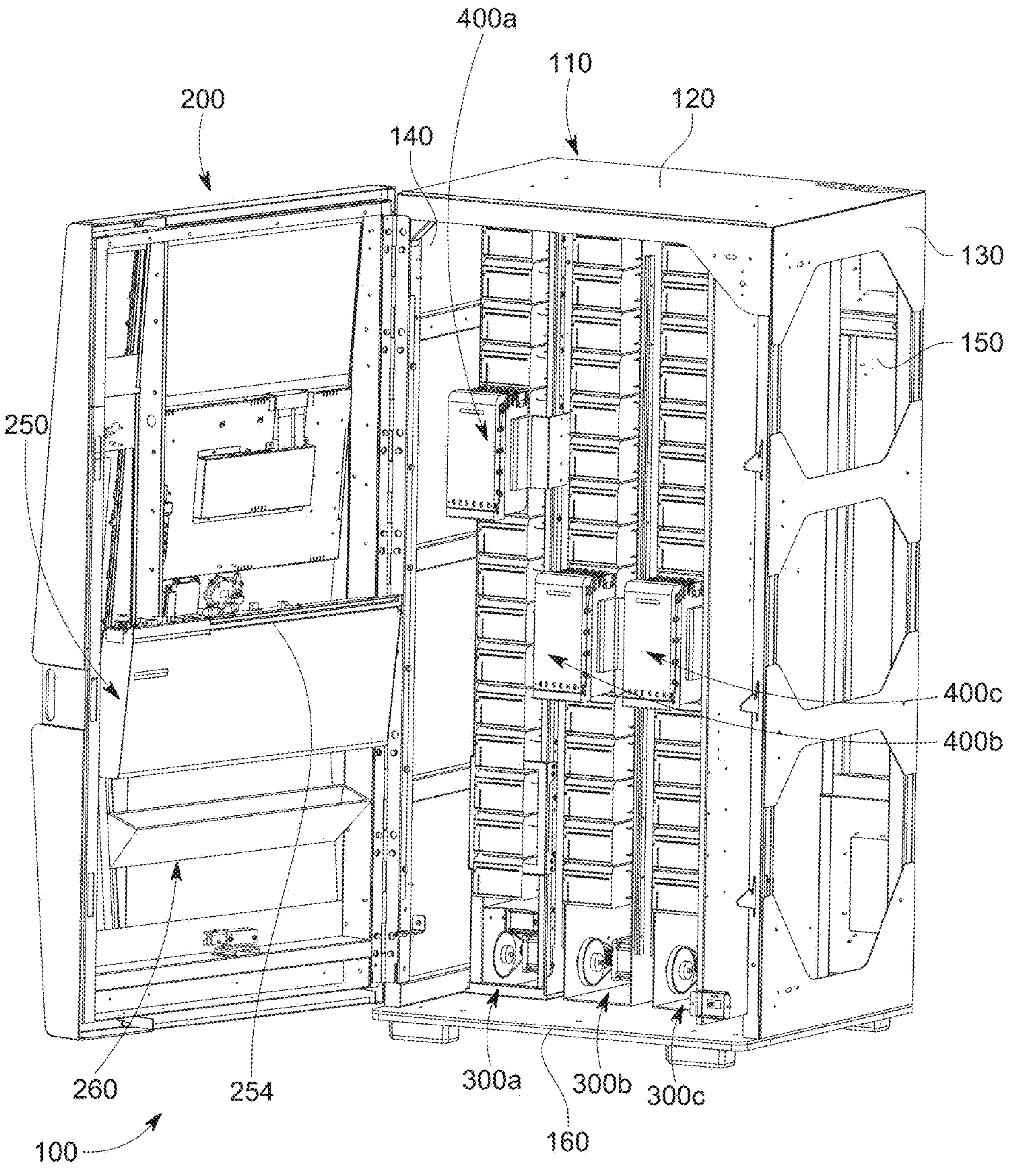
FIG. 2 is a front perspective view of the lottery ticket vending machine of FIG. 1 shown with the front door thereof in an open position, shown with a left side wall panel thereof removed, showing three ticket drawer holders including ticket drawers and cleaning pad drawers and three movable ticket bursters respectively associated with the three ticket drawer holders, and showing a ticket collection receptacle of the front door.
Figure 3:
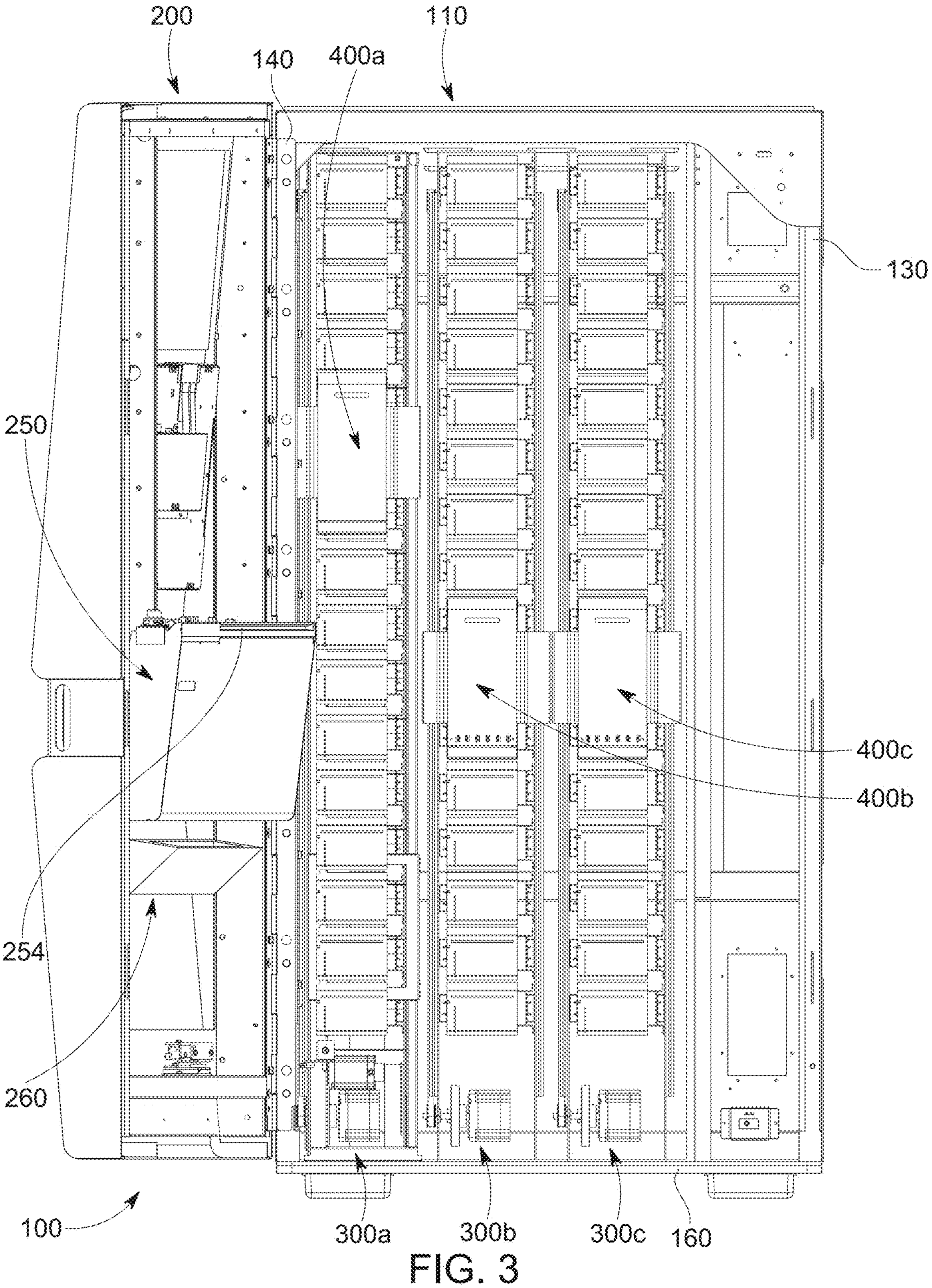
FIG. 3 is a front view of the lottery ticket vending machine of FIG. 1 shown with the front door thereof in the open position, shown with the left side wall panel thereof removed, showing the three ticket drawer holders and the three movable ticket bursters respectively associated the three ticket drawer holders, and showing the ticket collection receptacle of the front door.
Figure 4:
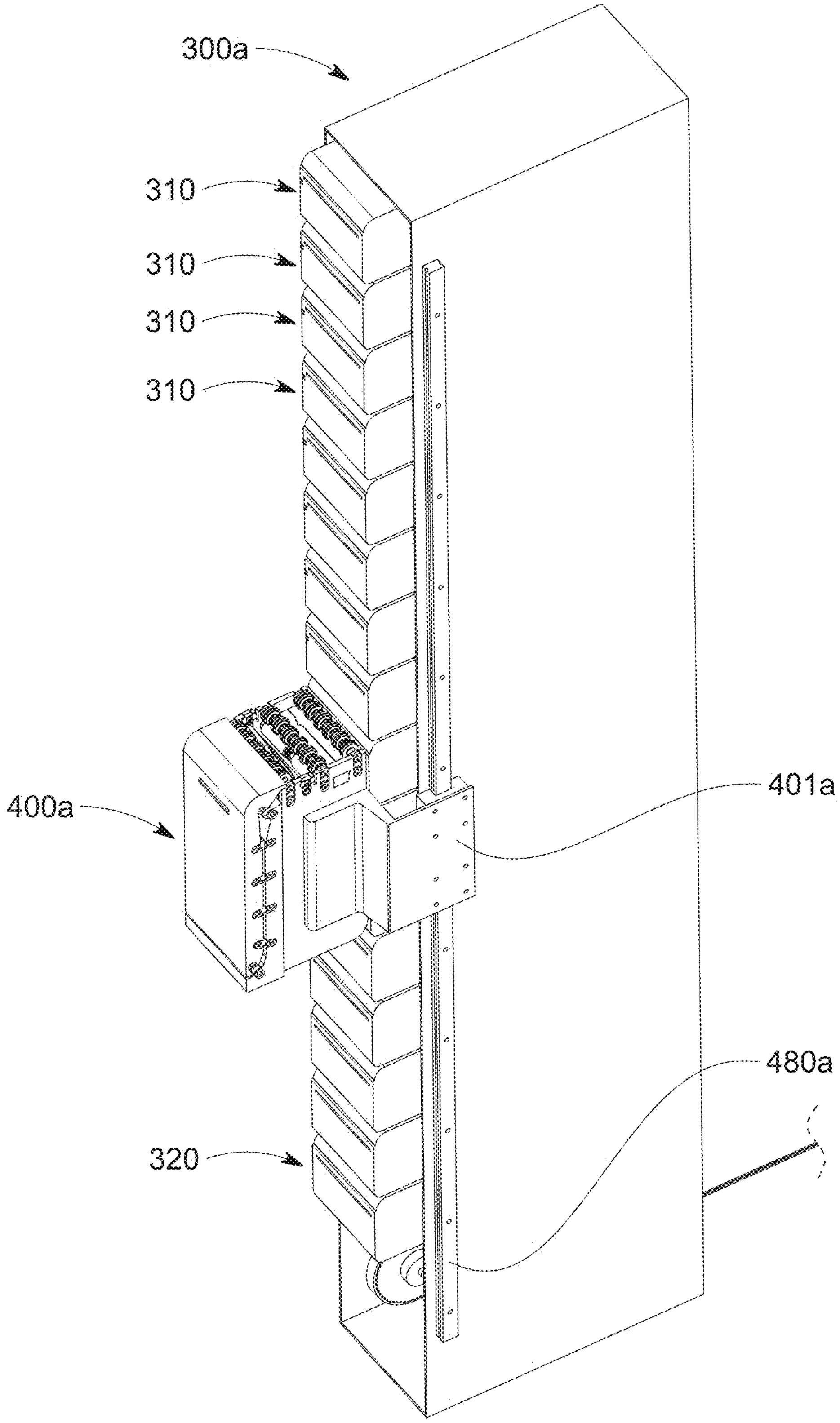
FIG. 4 is an enlarged fragmentary perspective view of one of the ticket drawer holders and the ticket burster associated with that ticket drawer holder of the lottery ticket vending machine of FIG. 1 shown removed from the lottery ticket vending machine.

In this illustrated example embodiment, the machine housing 110 includes a top wall 120, spaced-apart side walls 130 and 140, a rear wall 150, a base 160, and the openable front door 200 pivotally connected to the side wall 140. The base 160 is configured to rest on a floor or other suitable support. The machine housing 110 includes suitable vertically extending supports (not labeled) configured to hold and support the respective ticket drawer holders 300*a*, 300*b*, and 300*c*. The front door 200 is moveable from a closed and locked position covering the open front face of the machine housing 110 as shown in FIG. 1 to an open position allowing access to the interior of the machine housing 110 as shown in FIGS. 2 and 3. The front door 200 is mounted by hinges (not labeled) to the side wall 140 of the machine housing 110. A suitable locking mechanism (not shown) is mounted on the front door 200 and the side wall 130 of the machine housing 110 to facilitate locking of the front door 200 in the closed position. When the front door 200 is closed and locked, the interior of the machine housing 110 is generally secured so as to be inaccessible except by an authorized person. The front door 200 can include one or more areas for any components supported by the front door and/or that are contained in and/or protected by the structure of the front door 200. The front door 200 can include one or more openings such as for a glass panel that enables people to see into the machine housing 110 and for one or more of the purchaser interface components (such as those described below). The size and configuration of the machine housing can vary in accordance with the present disclosure.

The ticket collection receptacle 250 of the front door 200 is configured to receive lottery tickets from each of the movable ticket bursters 400*a*, 400*b*, and 400*c*. The ticket collection receptacle 250 is configured to hold each lottery ticket received from the movable ticket bursters to enable the respective purchaser to retrieve the dispensed lottery ticket from the ticket collection receptacle 250. The ticket collection receptacle defines an elongated horizontally extending ticket receiving slot 254 (best seen in FIGS. 2 and 3). The ticket collection receptacle 250 and the front door define an elongated horizontally extending purchase ticket retrieval slot 278 (best seen in FIG. 1). The purchase ticket retrieval slot 278 is (and needs to be) large enough so that a purchaser can insert the purchaser's hand through the purchase ticket retrieval slot 278 to retrieve lottery tickets that are dispensed into the ticket collection receptacle 250. The ticket receiving slot 254 is (and needs to be) small enough so that a purchaser cannot insert the purchaser's hand through the ticket receiving slot 254 and thereby cannot access any of the ticket drawers of the ticket drawer holders 300*a*, 300*b*, or 300*c*. The position, size, and configuration of the ticket collection receptacle can vary in accordance with the present disclosure.

Each of the ticket drawer holders 300*a*, 300*b*, and 300*c* are identical in this example embodiment. For brevity, only ticket drawer holder 300*a* is described in detail herein. Likewise, the three movable ticket bursters 400*a*, 400*b*, and 400*c* are identical in this example embodiment. For brevity, only ticket burster 400*a* associated with the ticket drawer holder 300*a* is described herein.

Ticket drawer holder 300*a* includes a series of aligned drawers, including ticket drawers 310 and a cleaning pad drawer 320 that are vertically stacked in the holder. Each of the ticket drawers 310 is configured to hold one or more packs of lottery tickets such as instant lottery tickets for subsequent dispensing by the ticket vending machine 100. The ticket drawers 310 can vary in quantity, size, and configuration depending upon the particular size of the ticket vending machine 100 and the quantity, size, and shapes of the lottery tickets that the ticket vending machine 100 can or will dispense. Each ticket drawer 310 is configured to hold lottery tickets such as instant lottery tickets for selection by the purchasers. In various embodiments, the different ticket drawers 310 can hold different lottery ticket packs for different lottery games, but it should be appreciated, that two or more ticket drawers can hold the same type of lottery tickets.

In various embodiments, each of the ticket drawers 310 is configured to feed each instant lottery ticket held by that ticket drawer 310 into the associated ticket burster 400*a* when the ticket burster 400*a* is moved into alignment with such ticket drawer 310 (e.g., at a respective ticket receipt position) for receipt, bursting, and dispensing of that lottery ticket. This ticket movement can be caused by an actuation lever of the ticket burster 400*a* engaging a ticket movement assembly of the ticket drawer 310, or in another suitable manner. Bursting of the lottery ticket is the industry term for separating a lottery ticket from a pack of lottery tickets held in a ticket drawer. In this example embodiment, the ticket drawers 310 do not burst the lottery tickets and do not need any mechanisms for bursting the lottery tickets, but rather the moveable ticket burster 400*a* bursts the lottery tickets fed by the ticket drawers 310 in the ticket drawer holder 300*a* into that ticket burster 400*a*.

Figure 10:
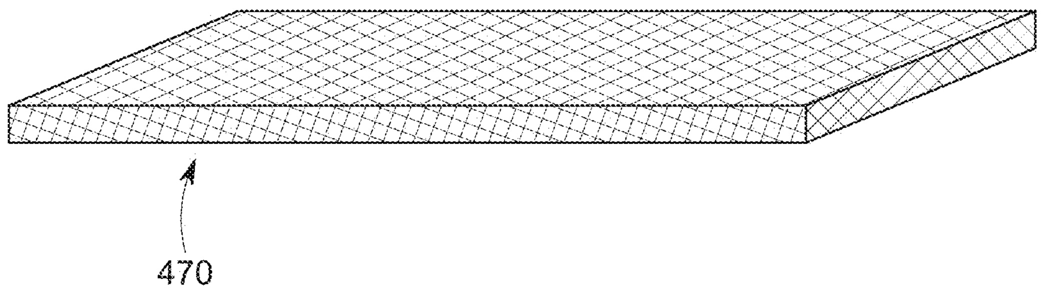
FIG. 10 is a side perspective view of an example embodiment of the cleaning pad shown in FIG. 9.

The cleaning pad drawer 320 is configured to hold one or more packs of cleaning pads, such as a cleaning pad 470 (as shown in FIG. 10) for cleaning the ticket burster 400*a*. A pack of cleaning pads can include all of the cleaning pads attached to each other but joined by perforations. Such cleaning pads 470 of a pack can be detached from each other along such perforations, similar to the lottery tickets of a lottery ticket pack described above. With this configuration of the pack of cleaning pads, the ticket burster 400*a* can readily detach and handle the cleaning pad 470 in a similar manner to the lottery tickets.

In various other embodiments, the cleaning pad drawer 320 holds only one reusable cleaning pad. In such embodiments, the cleaning pad is partially fed into the burster to clean the scan region of the burster, and then retracted back into the cleaning pad drawer for subsequent use. In such embodiments, the operator can replace the used cleaning pad when the operator services the lottery ticket vending machine such as to refill one or more of the ticket drawers of the lottery ticket vending machine.

The cleaning pad drawer 320 can vary in quantity, size, and configuration depending upon the particular size of the ticket vending machine 100 and the quantity, size, and shapes of the cleaning pads 470 with which the ticket vending machine 100 can or will clean the ticket burster 400*a*.

In various embodiments, the cleaning pad drawer 320 is configured to feed each cleaning pad 470 held by that cleaning pad drawer 320 into the associated ticket burster 400*a* when the ticket burster 400*a* is moved into alignment with such cleaning pad drawer 320 (e.g., a cleaning pad receipt position) for receipt, bursting, and handling of that cleaning pad 470. This ticket movement can be caused by an actuation lever of the ticket burster 400*a* engaging a cleaning pad movement assembly (not shown) of the cleaning pad drawer 320, or in another suitable manner. In this example embodiment, the cleaning pad drawer 320 does not burst the cleaning pads 470 and does not need any mechanisms for bursting the cleaning pads 470, but rather the moveable ticket burster 400*a* bursts the cleaning pads 470 fed by the cleaning pad drawer 320 in the ticket drawer holder 300*a* into that ticket burster 400*a*.

As shown in FIG. 10, the example cleaning pad 470 has a rectangular shape and uniform thickness. In the embodiment shown in the figures, the cleaning pad 470 has a same width as one of the instant lottery ticket to be dispensed from the ticket vending machine 100. As such, the cleaning pad 470 is sized to enable the cleaning pad 470 to follow the same ticket movement path 460 through the ticket burster 400*a* as the instant lottery tickets. In some embodiments, the cleaning pad 470 has a same length as one of the instant lottery tickets to be dispensed from the ticket vending machine 100. In other embodiments, the cleaning pad 470 has a longer length than one of the instant lottery tickets, such that the cleaning pad 470 has a larger cleaning surface area and volume for holding dust for improved cleaning of the scan region 435. In some embodiments, the cleaning pad 470 has a same height as one of the instant lottery tickets to be dispensed from the ticket vending machine 100. In other embodiments, the cleaning pad 470 has a taller height than one of the instant lottery tickets, such that the cleaning pad 470 has a larger cleaning surface area and volume for holding dust for improved cleaning of the scan region 435.

In this example embodiment, the cleaning pad 470 includes a fiber mesh or any other suitable structure configured to trap, collect, and/or attract dust and/or contaminants as the ticket burster 400*a* moves the cleaning pad 470 through the ticket movement path 460. In various embodiments, the cleaning pad 470 includes a fiber mesh of one or more of cellulose fiber, cotton fiber, hemp fiber, synthetic fiber (e.g., polyester, nylon), or other suitable fibers.

In various embodiments, the cleaning pad 470 includes a fiber mesh having a relatively loose weave with suitable gaps between adjacent fibers for capturing dust, such as a fiber mesh pattern of a cleaning sponge. In other embodiments, the cleaning pad 470 includes a fiber mesh having a relatively tight weave, such as a fiber mesh pattern of a paper towel. In some embodiments, the cleaning pad 470 includes an electrostatic region configured to attract dust by electrostatic attraction.

In various embodiments, the cleaning pad 470 includes a compressible fiber mesh portion that is resiliently compressible. In some such embodiments, the compressible fiber mesh portion is taller than the instant lottery tickets, but compressible to fit into the ticket movement path 460 and between rollers of the ticket burster 400*a*. With this configuration, the compressible fiber mesh portion naturally expands to brush a scanning surface of the scan region 435 with a higher frictional force to improve removal of contaminants.

In various embodiments, the cleaning pad 470 includes one or more reinforcement structures configured to stiffen the cleaning pad 470 such that the cleaning pad 470 is more easily manipulated and moved by the rollers of the ticket burster 400*a*. In some such embodiments, the reinforcement structures are strips of paper or other suitable material arranged to be located over one or more of the rollers of the ticket burster 400*a*.

As shown in FIGS. 2, 3, 4, and 5, the movable ticket burster 400*a* is supported by one or more burster supporters (such as burster supporter 480*a*). The burster supporters can be any suitable structure(s) that support(s) the ticket burster 400*a* in a manner that enables the ticket burster 400*a* to vertically move to any of the different ticket receipt positions that are associated with and in alignment with the respective ticket drawers 310 of the ticket drawer holder 300*a* and the cleaning pad receipt position associated and in alignment with the cleaning pad drawer 320. Each of the burster supporters also support the ticket burster 400*a* in a manner that enables the ticket burster 400*a* to vertically move to into alignment with the ticket receptacle 250 and the rejection area 260.

The ticket vending machine 100 includes one or more actuators (not shown) that control movement of the ticket burster 400*a* under control of the controller of the ticket vending machine 100 and/or the controller of the ticket burster 400*a*. In this example, an actuator (not labeled) is mounted at the bottom of the ticket drawer holder 300*a* and coupled to the ticket burster 400*a* by suitable linkages (such as but not limited to pulleys and a drive belt (not labeled)). The actuator is configured to move the ticket burster 400*a* under the control of the controller(s) in the vertical (e.g., up and down) directions. The movable ticket burster 400*a* is thus moveable, via this actuator and linkages on the ticket burster supporters to different vertical positions including a plurality of the ticket receipt positions respectively associated and aligned with each of the ticket drawers 310 of the ticket drawer holder 300*a* such that the ticket burster 400*a* is positioned to receive one or more of the lottery tickets stored in each respective ticket drawer 310 of the ticket drawer holder 300*a* for obtaining and dispensing that instant lottery ticket into the ticket receptacle 250 for the purchaser as requested by the purchaser.

The moveable ticket burster 400*a* is also moveable, via the actuator and linkages on the ticket burster supporters, to the cleaning pad receipt position associated and in alignment with the cleaning pad drawer 320 such that the ticket burster 400*a* is positioned to receive one or more of the cleaning pads 470 stored in the cleaning pad drawer 320 for obtaining and handling of that cleaning pad 470. The ticket burster 400*a* is configured to move the cleaning pad 470 through the ticket burster 400*a* and to eject the cleaning pad 470 from the ticket burster 400*a*, for example, into the rejection area 260.

Figure 5:
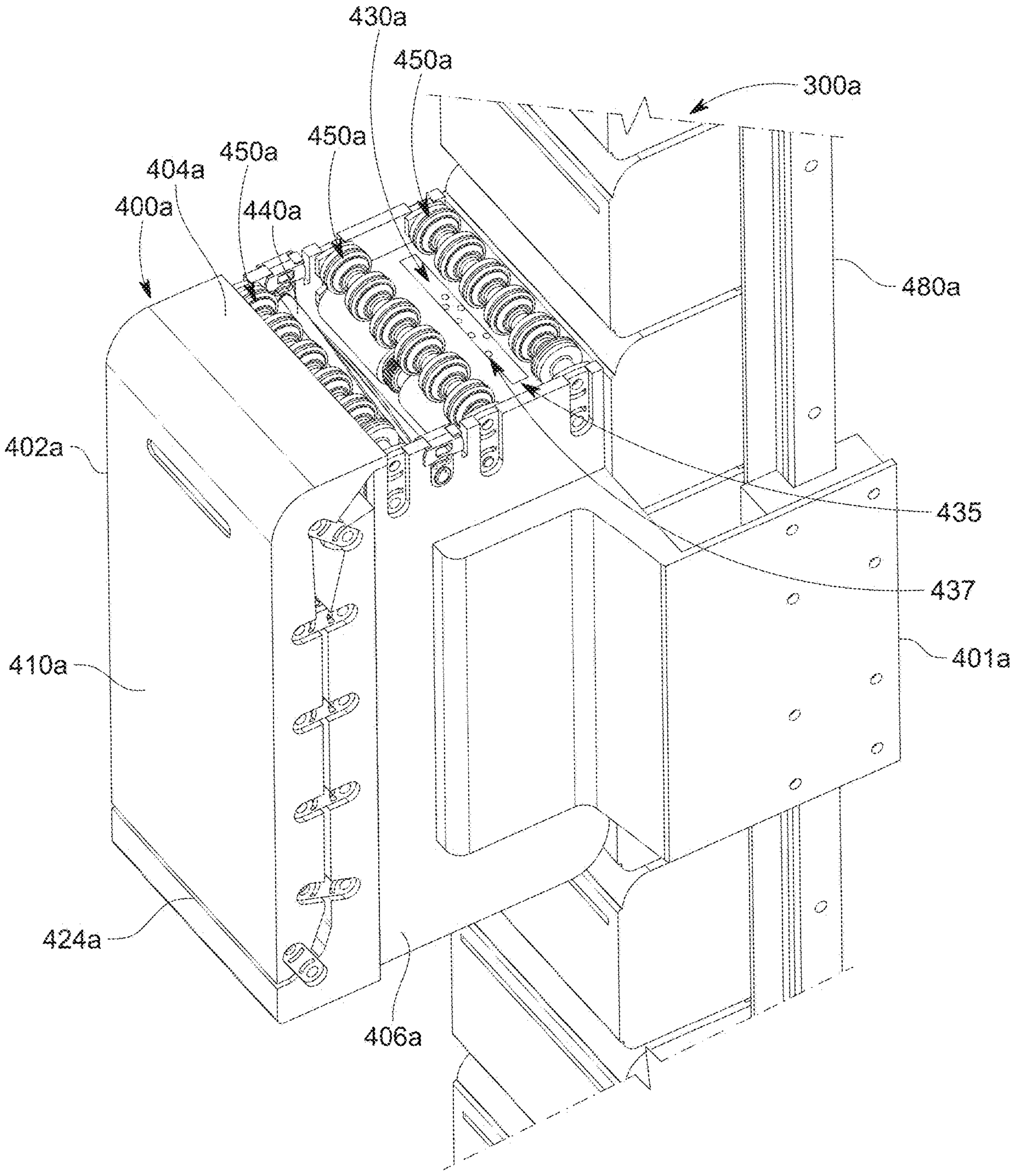
FIG. 5 is an enlarged fragmentary perspective view of the ticket drawer holder and the ticket burster of FIG. 4, showing a barcode reader of the ticket burster with contaminants in a scan region of the ticket burster.
Figure 6:
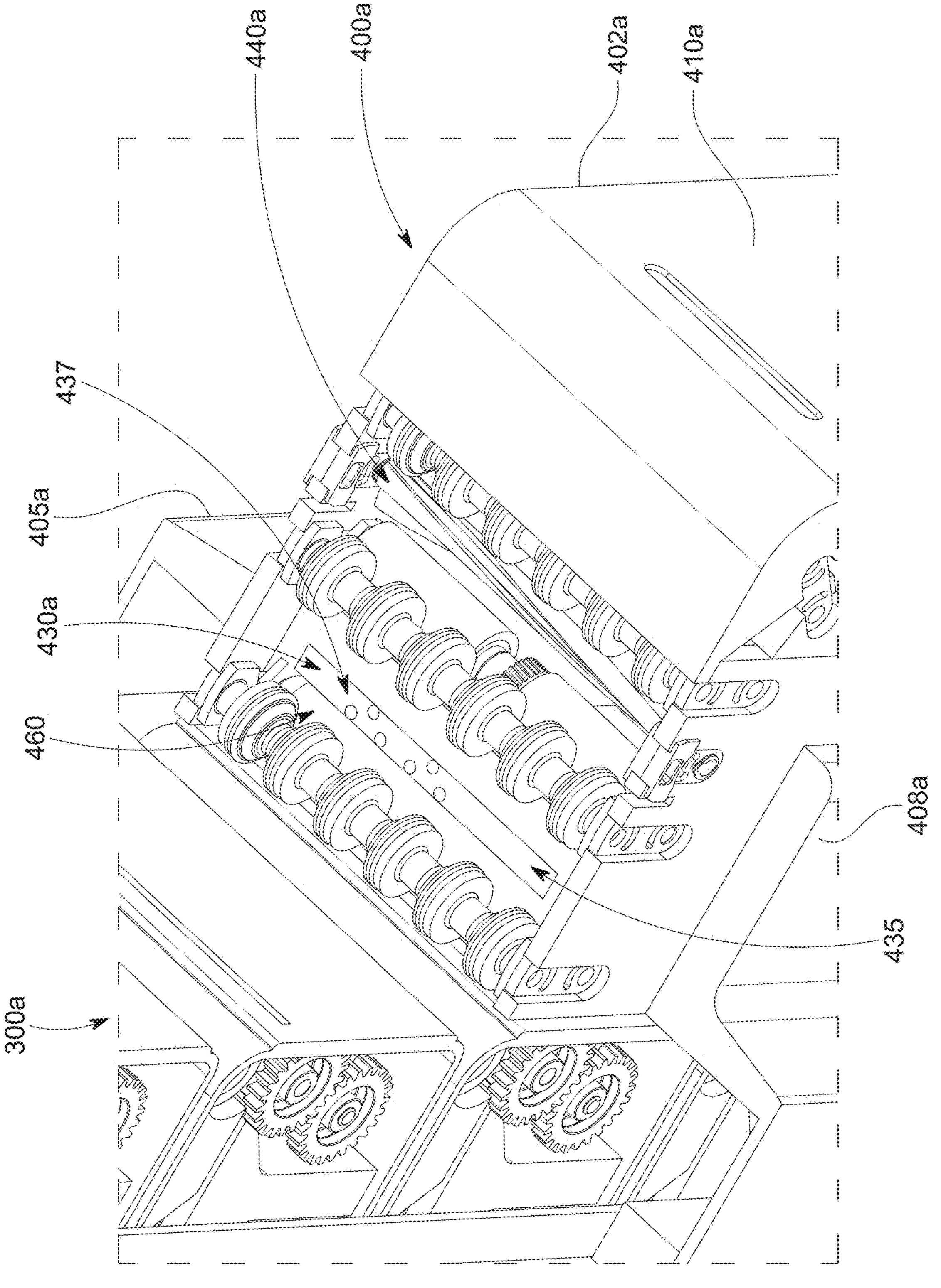
FIG. 6 is another enlarged fragmentary perspective view of the ticket drawer holder and the ticket burster of FIG. 4, showing the contaminants in the scan region of the ticket burster.
Figure 7:
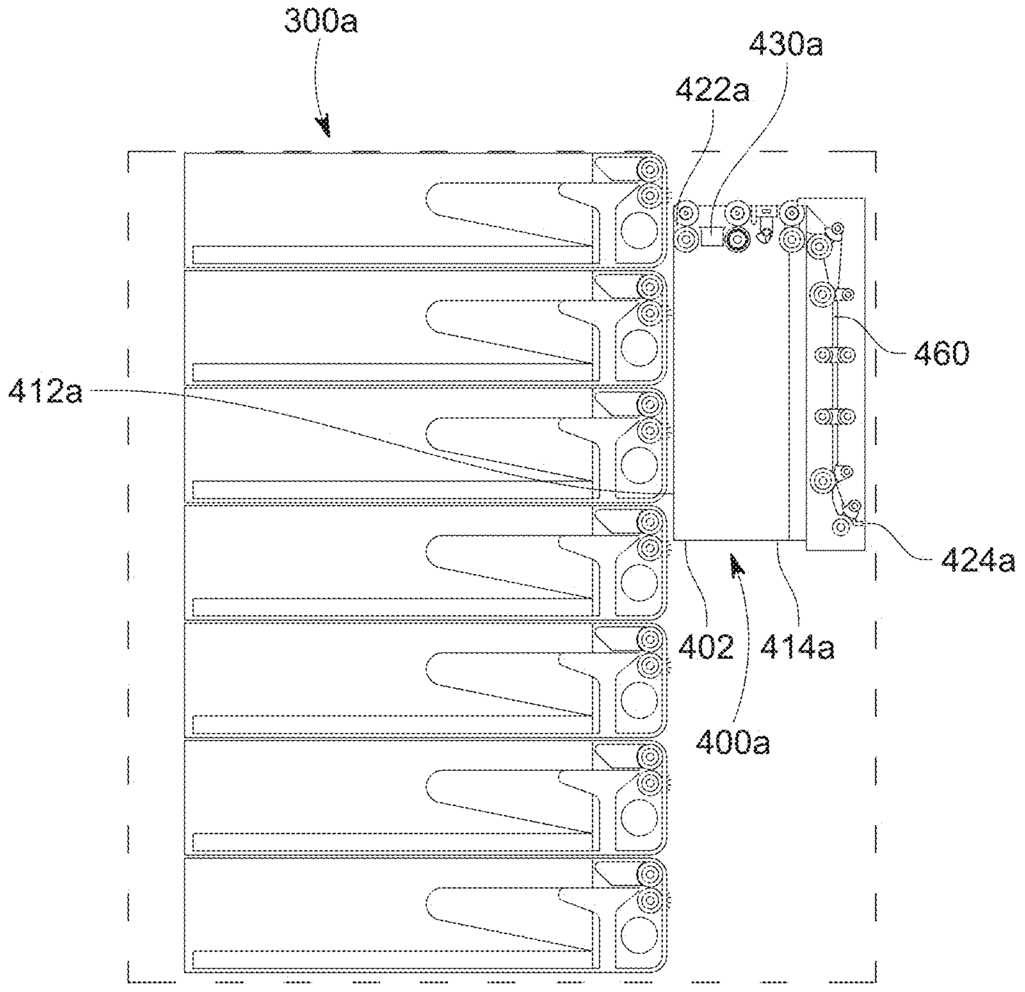
FIG. 7 is an enlarged fragmentary side view of the ticket drawer holder and the ticket burster of FIG. 4.
Figure 8:
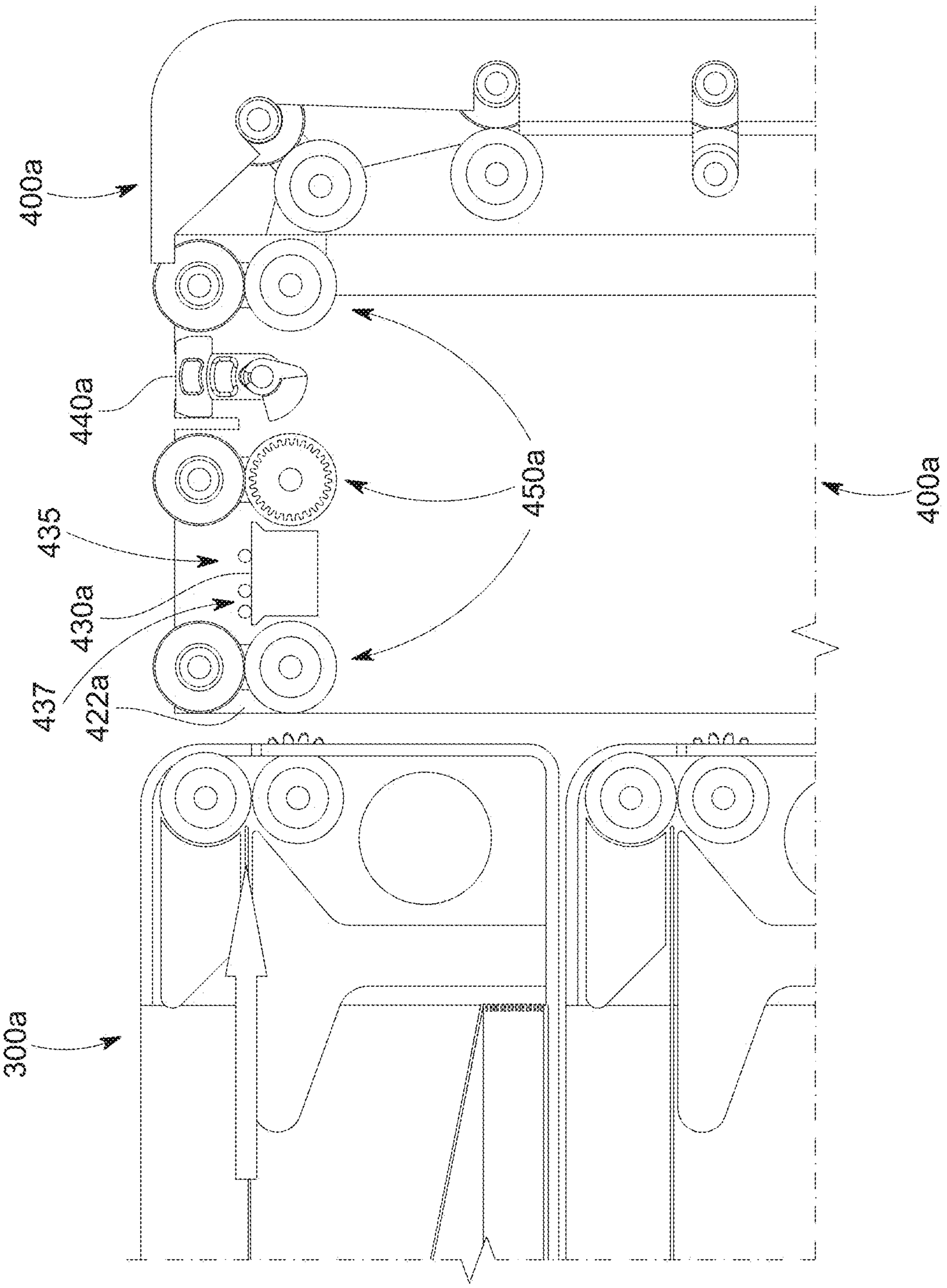
FIG. 8 is another enlarged fragmentary side view of the ticket drawer holder and the ticket burster of FIG. 4, showing the contaminants in the scan region of the ticket burster.

As best shown in FIGS. 5, 6, and 7, the example movable ticket burster 400*a* generally includes: (a) a burster housing 402*a*; (b) one or more burster supporter connecters (such as burster support connector 401*a* connecting the burster housing 402*a* and the burster supporter 480*a*); (c) a barcode reader 30 *a* in and supported by the burster housing 402*a*; (d) a ticket cutter 440*a* in and supported by the burster housing 402*a*; (e) a plurality of ticket engagers 450*a* supported by the burster housing 402*a*; and (f) a burster controller (not shown). The size and configuration of the ticket burster 410*a* can vary in accordance with the present disclosure. As indicated above, it should also be appreciated that in other embodiments, the ticket burster 410*a* includes more than one barcode reader for determining barcode related data.

More specifically, the burster housing 402*a* generally includes a top member 404*a*, spaced-apart side members (not labeled), a front member 410*a*, a rear member 412*a*, and a bottom member 414*a*. The burster housing 402*a* also includes a plurality of internal members (not individually labeled) that define a ticket inlet 422*a*, through which the ticket burster 400*a* is configured to receive a lottery ticket from a ticket drawer of the ticket drawer holder 300*a*, a ticket outlet 424*a* through which the ticket burster 400*a* is configured to dispense the received instant lottery ticket into the ticket collection receptacle 250, and a ticket movement path 460 extending from the ticket inlet 422*a* to the ticket outlet 424*a* and through which the lottery ticket is moved through the ticket burster 400*a*. In various embodiments, the ticket burster 400*a* is further configured to move to the cleaning pad receipt position, receive a cleaning pad 470 from the cleaning pad drawer 320 of the ticket drawer holder 300*a* via the ticket inlet 422*a*, move the cleaning pad 470 through the ticket movement path 460, and eject the cleaning pad 470 through the ticket outlet 424*a*, for example, into the rejection area 260.

The ticket cutter 440*a* is positioned in the burster housing 402*a* and configured to rotate to cut the perforations attaching each lottery ticket that moves along the ticket movement path in the ticket burster 400*a* to the next lottery ticket of the continuous strip of lottery tickets received from the respective ticket drawer. Similarly, in various embodiments, the ticket cutter 440*a* is configured to rotate to cut the perforations attaching each cleaning pad that moves along the ticket movement path 460 to the next cleaning pad of the strip of cleaning pads received from the cleaning pad drawer 320. The ticket cutter 440*a* is configured to make such cut(s) along the perforations between the two connected lottery tickets of such strip. The ticket cutter 440*a* is controlled by the burster controller and/or the controller of the ticket vending machine 100. In this example embodiment, the ticket cutter 440*a* is inwardly positioned (i.e., positioned downstream) from the ticket inlet 422*a*. After the ticket cutter 440*a* cuts the lottery ticket requested by the purchaser from the respective ticket drawer, the ticket drawer can retract the portion of the next lottery ticket (of the strip of lottery tickets) from the ticket burster 400*a* before the ticket burster 400*a* moves from the ticket receipt position aligned with that ticket drawer. This ticket movement can be caused by an actuation lever of the burster engaging a ticket movement assembly of the ticket drawer, or in another suitable manner. In other embodiments, the ticket burster 400*a* can be configured such that the ticket cutter is positioned closer to or on the other side of the ticket inlet (i.e., positioned upstream of the ticket inlet) such that after the ticket cutter cuts the lottery ticket along the perforations connecting that lottery ticket to the next lottery ticket in the strip, the ticket drawer may not need to withdraw the next instant lottery ticket in the strip or may only need to withdraw the next instant lottery ticket in the strip a relatively small distance. The position, size, and configuration of the ticket cutter can thus vary in accordance with the present disclosure.

In other embodiments, the ticket burster 400*a* can be configured such that the burster housing 402*a* is rotatable about a horizontal axis to separate (via a tearing and/or twisting motion) each lottery ticket along the perforations connecting that lottery ticket to the next lottery ticket in the strip. In such embodiments, the ticket drawer may not need to withdraw the next lottery ticket of the strip or may only need to withdraw the next lottery ticket of the strip a relatively small distance. In such embodiments, the ticket burster may not need a ticket cutter.

It should be appreciated that the ticket burster 400*a* is thus configured to burst the perforations between the lottery ticket being dispensed and the next lottery ticket of the strip so as to enable the dispensed lottery ticket to be dispensed into the ticket receptacle 250. This prevents a person from improperly tearing a lottery ticket or being able to pull an extended number of lottery tickets from one of the ticket packs in one of the ticket drawers. In various embodiments, the ticket burster 400*a* is thus also configured to burst the perforations between a cleaning pad and a next cleaning pad of the strip from the cleaning pad drawer 320. It should be appreciated that the ticket burster 400*a* can be moved to a dispensing location for each lottery ticket dispensed, or for only certain lottery tickets dispensed. It should also be appreciated that the ticket burster can moved to a different location for any lottery ticket that is deemed to be bad or non-dispensable for any reason, and to deposit that ticket into a suitable rejection area. Similarly, the ticket burster 400*a* can be moved to the suitable rejection area for ejection of the cleaning pad 470.

The ticket engagers 450*a* in this example embodiment include multiple driven rollers (not labeled) and multiple guide rollers (not labeled). The driven rollers are rotated by suitable actuators (not shown) under the control of the burster controller and/or the controller of the ticket vending machine 100. The driven rollers and the guide rollers are configured to move (such as by pulling) and guide each lottery ticket along the ticket movement path and out of the ticket outlet 424*a*. In alternative embodiments, the ticket engagers are configured to grip and pull each lottery ticket from the respective ticket drawer.

The burster controller (not shown) can be any suitable type of controller (such as a programmable logic controller) that includes any suitable processing device(s) (such as a microprocessor, a microcontroller-based platform, an integrated circuit, or an application-specific integrated circuit) and any suitable memory device(s) (such as random access memory, read-only memory, or flash memory). The memory device(s) stores instructions executable by the processing device(s) to control operation of the ticket burster 400*a*. The burster controller can be hard wired or wirelessly connected to and in communication with the cutter 440*a*, the actuators for the driven rollers 450*a*, any actuators of the ticket burster 400*a* that cause the movement of the ticket burster 400*a*, and the barcode reader 430*a* (as further described below). In such embodiments, the burster controller can be wirelessly connected to and in communication with the controller of the ticket vending machine 100. In other embodiments, the ticket burster does not include a controller and is completely controlled by the controller of the ticket vending machine 100. In such embodiments, the controller of the ticket vending machine 100 can be hard wired to or wirelessly connected to and in communication with the cutter, the actuators for the driven rollers, any actuators on the ticket burster or the burster supporter that cause the movement of the ticket burster, and the reflective sensor.

The example barcode reader 430*a* of the ticket burster 400*a* is positioned in and supported by the housing 402*a* of the ticket burster 400*a*. The barcode reader 430*a* extends transversely along the entire or substantially the entire width of the ticket burster 400*a* such that the barcode reader 430*a* can sense the one or more barcodes of each lottery ticket that moves through the ticket burster 400*a* as that lottery ticket moves above the barcode reader 430*a*. In this example embodiment, the barcode reader 430*a* is below the ticket movement path and thus scans upwardly into a scan region 435 and toward the lottery ticket. In other alternative embodiments that are not shown, the barcode reader can be above the ticket movement path and thus scan downwardly into the scan region 435 and toward the lottery ticket (which would be oriented to have the barcode facing upwardly).

In various embodiments, the barcode reader 430*a* is configured to detect different contrasting colors (such as but not limited to black and white colors) associated with one or more barcodes of each lottery ticket. When light from an emitter (not shown) of the barcode reader 430*a* strikes an area of the barcode of the lottery ticket in the ticket burster 400*a*, that section reflects some or all of the light back toward the barcode reader 430*a*. When light from an emitter (not shown) of the barcode reader 430*a* strikes a black line of the barcode, the black line absorbs some or all of the light and does not reflect all of the light back toward the barcode reader 430*a*. For example, the white areas of the barcode of the lottery ticket in the ticket burster 400*a* will each reflect the light back toward the reflective sensor 430*a*, and the black lines of the barcode of the lottery ticket will not reflect the light back toward the barcode reader 430*a* (i.e., the black lines of the barcodes will absorb the light). When the light is reflected back toward the barcode reader 430*a*, that reflected light enters a receiver (not shown) of the barcode reader 430*a* (where the intensity of light can be increased if needed in certain embodiments). In various embodiments, the light emitted is a fixed amount of light and the reflected light back is a function of the color/contrast differential on the lottery ticket. It should be appreciated that the operation of the barcode reader (including the amount of light emitted by the barcode reader) can vary in accordance with the present disclosure.

Contaminants such as dust 437 (described below) can enter the scan region 435 and impede the barcode reader 430*a* from scanning the barcodes. The dust 437 can partially or fully obstruct a view of a barcode of a lottery ticket in the scan region 435 by the barcode reader 430*a*. When light from the emitter of the barcode reader 430*a* strikes an area within the scan region 435 with dust 437 present, the dust 437 can affect an amount of light able to be reflected by a white line and/or black line of the barcode behind the dust 437. For example, the dust 437 can cause reflection of less light, which can reduce contrast between white lines and black lines, potentially resulting in an incorrectly read barcode and incorrect barcode related data.

In various embodiments, the ticket vending machine 100 causes the cleaning of the ticket burster 400*a* via the cleaning pads 470 on a regularly scheduled basis. In some such embodiments, the controller(s) is/are configured to cause the ticket burster 400*a* to perform a cleaning operation on a particular time interval, for example, on a daily interval, on a weekly interval, and/or on a monthly interval. In some such embodiments, the controller(s) is/are configured to cause the ticket burster 400*a* to perform the cleaning operation at a particular time of day, for example, a time at which the lottery ticket vending machine is less likely to be utilized, for example, at 4:00 AM in the morning. In some such embodiments, the controller(s) is/are configured to cause the ticket burster 400*a* to perform a cleaning operation based on a number of lottery tickets dispensed by the lottery ticket vending machine 100 (e.g., after every 100 dispensed lottery tickets). In various embodiments, the controller(s)

is/are configured to signal a burster cleaning condition to the ticket burster to cause the ticket burster to perform the cleaning operation.

Figure 9:
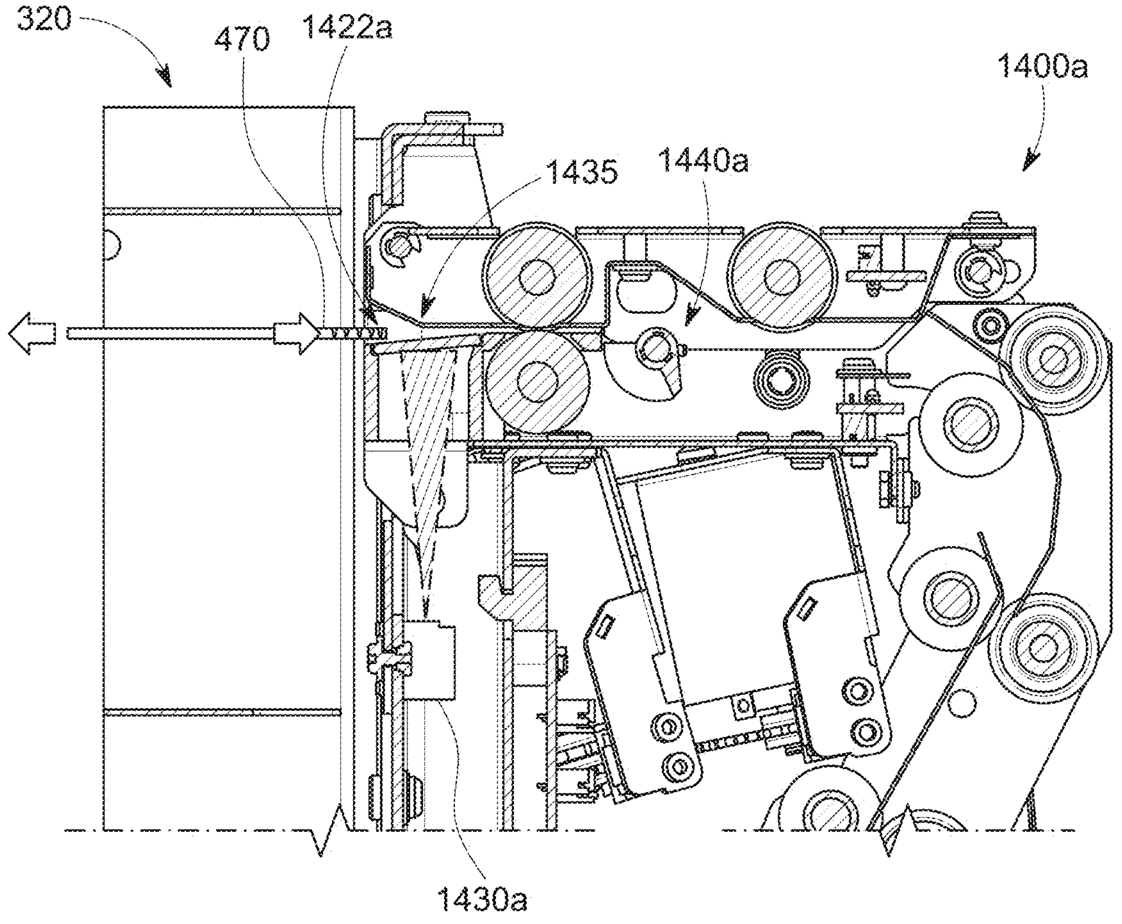
FIG. 9 is an enlarged fragmentary side view of another example embodiment of a ticket burster associated with one of the ticket drawer holders of the lottery ticket vending machine of FIG. 1, the cleaning pad drawer associated with that ticket drawer holder, and a cleaning pad.

FIG. 9 illustrates an example alternative movable ticket burster 1400*a* in accordance with another example embodiment of the present disclosure. The ticket burster 1400*a* is similar to the ticket burster 400*a* and includes: (a) a barcode reader 1430*a*; (b) a ticket cutter 440*a*; (c) a plurality of ticket engagers 1450*a*; and (d) a burster controller (not shown). The size and configuration of the ticket burster 1410*a* can vary in accordance with the present disclosure. In this embodiment, the barcode reader 1430*a* is positioned further from a scan region 1435 and is beneath a glass panel.

An example method of operation of the ticket vending machine 100 is now described. It should be appreciated that the following example is not the only method of operation of the ticket vending machine of the present disclosure, and other methods of operation are within the scope of the present disclosure. It should also be appreciated that the operations are controlled by the controller of the ticket vending machine and/or the controller of the ticket bursters, and that the descriptions provided below of the steps are controlled by such controllers.

This example is when a cleaning operation trigger is received from one or more controllers of the ticket vending machine, for example, when a burster cleaning condition is determined. Responsive to the cleaning operation trigger, the ticket vending machine 100 causes the ticket burster 400*a* to obtain and handle a cleaning pad 470 to perform the cleaning operation. More specifically, this includes: (1) moving the ticket burster 400*a* into a cleaning pad receipt position associated with and in alignment with the cleaning pad drawer 320 of the ticket draw holder 300*a*; (2) causing a leading cleaning pad 470 of the cleaning pad drawer 320 to be fed into the ticket inlet 422*a* of the ticket burster 400*a*; (3) causing the ticket engagers 450*a* to engage and cause that cleaning pad 470 to move along the ticket movement path 460 of the ticket burster 400*a*, including through the scan region 435 to capture any dust 437 and/or other contaminants; (4) at the appropriate time when the perforations connecting that cleaning pad 470 to the next cleaning pad of that strip are aligned with the ticket cutter 440*a*, causing the ticket cutter 440*a* to cut the perforations and thus separate that cleaning pad 470 from the next cleaning pad in the strip; (5) causing the cleaning pad drawer 320 to retract any portion of that next cleaning pad of the strip from the ticket burster 400*a*; (6) causing the ticket burster 400*a* to move into alignment with the rejection area 260; and (7) causing the ticket engagers 450*a* to move the separated cleaning pad 470 along the ticket movement path 460 toward and out of the ticket outlet 424*a*, and into the rejection area 260.

In various embodiments, the cleaning pad drawer 320 is configured to hold both the cleaning pads 470 and various instant lottery tickets. In some such embodiments, the cleaning pad drawer 320 holds cleaning pads during a first period (e.g., an initial loading of the cleaning pad drawer 320) and holds instant lottery tickets during a second period (e.g., for a subsequent loading of the cleaning pad drawer 320). In some such embodiments, the cleaning pad drawer 320 is configured to hold a hybrid pack that includes both a plurality of instant lottery tickets and one or more cleaning pads. For example, the hybrid pack can include 100 instant lottery tickets and one cleaning pad.

In various embodiments, the cleaning pad 470 includes a towel or brush that is configured to be moved through the ticket movement path 460.

In various embodiments, the cleaning pad 470 includes a towel or brush that is configured to be moved through the ticket movement path 460 and is combine with one or more air movement devices (such as one or more blower devices and/or one or more vacuum devices).

In various embodiments, the cleaning pad drawer 320 includes one or more air movement devices configured to cause a displacement of air through the scan region 435. In one such embodiment, the cleaning pad drawer 320 includes one or more blower devices configured to blow air through the ticket inlet 422*a*, causing the dust 437 to be displaced from the scan region 435. In another such embodiment, the cleaning pad drawer 320 includes one or more vacuum devices configured to suck air from the ticket inlet 422*a*, causing the dust 437 to be displaced from the scan region 435. In various embodiments, the ticket burster 400*a* is configured for air displacement of the dust 437. In some such embodiments, the ticket burster 400*a* includes an egress port to eject air from the blower after the air has moved through the scan region 435. In some such embodiments, the ticket burster 400*a* includes an ingress port for air to be provided to the vacuum.

In various embodiments, the one or more controllers are also configured to receive scan region contaminant data from the one or more barcode readers (such as but not limited to contact image sensor (CIS) bar code type scanners), analyze such scan region contaminant data with respect to comparison data, make determinations regarding the presence of contaminants in the one or more scan regions of the ticket burster, and any needed cleaning operations and/or alerts, and to cause any such determined needed cleaning operations and/or alerts to be performed. In various such embodiments, the scan region contaminant data identifies potential lottery ticket scanning issues, such as an obstruction of a view of the barcodes on instant lottery tickets by the one or more barcode readers. In various such embodiments, the ticket burster is configured to: (1) provide scan region contaminant data to the one or more controllers; (2) receive a cleaning operation trigger from the one or more controllers; (3) move the ticket burster into alignment with a cleaning pad drawer; (4) obtain a cleaning pad from one or more cleaning pad drawers of the lottery ticket vending machine; (5) move the cleaning pad through the one or more scan regions to clean the one or more scan regions; and (6) eject the cleaning pad from such ticket burster.

In various embodiments, the ticket vending machine is also configured to detect the presence of contaminants (e.g., when scanning the barcodes of each lottery ticket) for determining any lottery ticket scanning issues and for addressing such lottery ticket scanning issues. The lottery ticket vending machine is configured to take one or more corrective actions (such as a cleaning operation that includes moving one or more cleaning pads through the ticket movement paths of the ticket bursters) to address determined lottery ticket scanning issue(s), and/or is configured to provide one or more alerts to an operator of the vending machine that enables the operator to fix the cause of such determined lottery ticket scanning issue(s). It should be appreciated that these actions including the alerts can be suitably tracked and stored (such as by the controller of the lottery ticket vending machine or a remote system) for future reference and use.

In various embodiments, the barcode reader 430*a* is configured to detect the presence of contaminants in the scan region 435. The contaminants, such as dust 437, can obstruct a view of barcodes in the scan region 435 by the barcode reader 430*a*, which can change the colors associated with one or more barcodes of each lottery ticket. When light from the emitter of the barcode reader 430*a* strikes an area within the scan region 435 with dust 437 present, the dust 437 can affect an amount of light able to be reflected by a white line and/or black line behind the dust 437. In some scenarios, for example, the dust 437 reflects less light than a white line and reflects more light than a black line, which can reduce contrast between white lines and black lines, resulting in higher power consumption (where intensity of the light is increased to compensate for the reduced contrast) and/or incorrectly read barcode related data.

In various embodiments, the barcode reader 430*a* creates and sends electrical signals (that can be digital or analog in different embodiments) to one or more of the controllers of the burster and/or the controller of the vending machine 100. The electrical signals represent two types of data (as indicated above). The first type of data is the barcode data that the controller(s) use to determine the identification of the lottery ticket. The second type of data is the scan region contaminant data that the controller(s) use to determine the presence of contaminants in the ticket burster 400*a*.

In various embodiments, the respective controller(s) receive and interpret the barcode related data in a conventional manner, and thus is not described in detail herein.

In various embodiments, the respective controller(s) receive and interpret the scan region contaminant data in comparison to comparison data (such as but not limited to an expected scan region contaminant data for the scan region of the ticket burster). If the scan region contaminant data does not correspond to or match (or substantially correspond to or match) the comparison data, the controller(s) determine(s) that contaminants are present in the scan region 435 and can take the correction actions and/or send the alerts. In various embodiments, the corrective action and/or the alerts are based on the amount of disparity between scan region contaminant data and the comparison data (such as the expected scan region contaminant data). In various embodiments, the comparison data can be based on data associated with expected contrast ratios between white lines and black lines of barcodes on the instant lottery tickets. For example, controller can determine that a lower contrast ratio than an expected contrast ratio indicates a likely presence of dust 437 in the scan region 435.

In various embodiments, the barcode reader 430*a* is thus configured to: (1) generate and communicate signals (relating to the scan region 435); (2) communicate signals (relating to the scan region 435) to the burster controller and/or the controller of the ticket vending machine 100; and (3) enable the controller(s) to determine if contaminants are present in the scan region 435.

In various embodiments, if the burster controller and/or the controller of the ticket vending machine 100 determines that contaminants are not present in the scan region 435, the burster controller and/or the controller of the ticket vending machine 100 does not need to take any corrective actions. For purposes of the present disclosure, contaminants can be considered to be not present in the scan region 435 if a contrast ratio associated with a scanned barcode of a lottery ticket meets or exceeds a threshold value.

In various embodiments, if the burster controller and/or the controller of the ticket vending machine 100 determines that contaminants are present in the scan region 435, the burster controller and/or the controller of the ticket vending machine 100 can take one or more of a series of different corrective actions. For purposes of the present disclosure, contaminants can be considered to be present in the scan region 435 if a contrast ratio associated with the scanned barcode of the lottery ticket does not meet the threshold value.

In various different embodiments, the respective corrective action taken in such case can vary and can be any one or more of the following example corrective actions: (1) cause the ticket burster 400*a* to move into alignment with the cleaning pad drawer 320 and automatically cause the ticket burster 400*a* to obtain a cleaning pad 470 from the cleaning pad drawer 320 and move that cleaning pad 470 through the ticket movement path 460; (2) cause a display of a warning message on a display device of the vending machine 100 to alert an operator of the vending machine 100 regarding the presence of contaminants in the scan region 435 to enable the operator to act on such issue and fix the issue (e.g., by triggering a cleaning operation); and/or (3) send a warning message to a remote monitoring device separate from the vending machine regarding the presence of contaminants in the scan region 435 to enable an operator to act on such issue and fix the issue (e.g., by triggering a cleaning operation).

In various embodiments, the cleaning pad 470 includes a reference barcode configured to be read by the barcode reader 430*a* to provide the scan region contaminant data. The reference barcode can be a barcode (or other suitable symbol or pattern) configured to cause the barcode reader to provide a suitable signal to the controller(s) for determining the presence of contaminants in the scan region 435.

The present disclosure further contemplates that the controller(s) can determine the comparison data (such as for comparison with the scan region contaminant data) for the scan region of the ticket burster in any suitable manner such as but not limited to one of the plurality of different example manners described below.

In one example manner, the controller(s) are configured to receive the comparison data such as the expected scan region contaminant data for the scan regions of the ticket bursters from a remote source such as a central lottery system. In various such embodiments, the central lottery system can send the expected scan region contaminant data to the vending machine when the vending machine is initially configured and/or installed.

In another example manner, the controller(s) are configured to receive the comparison data such as the expected scan region contaminant data from a local source such from a memory device communicatively connected to the vending machine 100.

In another example manner, the controller(s) are configured to create or determine the comparison data such as the expected scan region contaminant data during a maintenance procedure that the vending machine 100 performs, for example, when packs of tickets and/or cleaning pads are loaded into a drawer of the vending machine.

Another example method of operation of the ticket vending machine 100 is now described. It should be appreciated that the following example is not the only method of operation of the ticket vending machine of the present disclosure, and other methods of operation are within the scope of the present disclosure. It should also be appreciated that the operations are controlled by the controller of the ticket vending machine and/or the controller of the ticket bursters, and that the descriptions provided below of the steps are controlled by such controllers.

This example is when a purchaser desires to purchase a single instant lottery ticket from the ticket vending machine 100. Responsive to and after the purchaser selects the lottery ticket (from the plurality of different lottery tickets available from the ticket vending machine 100) using the purchaser interface component(s) and specifically using one or more of the input devices and one or more of the payment acceptors to select and pay for the lottery ticket, the ticket vending machine 100 generally causes the ticket burster 400*a* to obtain and dispense that lottery ticket into the ticket collection receptacle 250. More specifically, this includes: (1) moving the ticket burster 400*a* into a ticket receipt position associated with and in alignment with the ticket drawer of the ticket draw holder 300*a* that holds the lottery ticket pack of the selected type of lottery ticket requested by the purchaser; (2) causing the leading lottery ticket that ticket drawer to be fed into the ticket inlet 422*a* of the ticket burster 400*a* (with the front face of the lottery ticket facing upwardly); (3) causing the ticket engagers 450*a* to engage and cause that lottery ticket to move along the ticket movement path of the ticket burster 400*a*; (4) at the appropriate time when the barcode of that lottery ticket passes through the scan region 435 above the barcode reader 430*a*, causing the barcode reader 430*a* to read the barcode(s) of that lottery ticket, and send barcode related data and scan region contaminant data to the burster controller and/or the controller of the ticket vending machine 100; (5) at the appropriate time when the perforations connecting that instant lottery ticket to the next lottery ticket of that strip are aligned with the ticket cutter 440*a*, causing the ticket cutter 440*a* to cut the perforations and thus separate that lottery ticket from the next lottery ticket in the strip; (6) causing the ticket drawer to retract any portion of that next lottery ticket of the strip from the ticket burster 400*a*; (7) causing the ticket burster 400*a* to move into alignment with the ticket collection receptacle 250; and (8) causing the ticket engagers 450*a* to move the separated lottery ticket along the ticket movement path toward and out of the ticket outlet 424*a*, and into the ticket collection receptacle 250.

Responsive to the scan region contaminant data, the one or more controllers can generally cause the ticket burster 400*a* to obtain and handle a cleaning pad 470 to perform the cleaning operation, as described above. In other words, if the burster controller and/or the controller of the ticket vending machine 100 determines based on the scan region contaminant data that dust 437 is present in the scan region 435, the burster controller and/or the controller of the ticket vending machine 100 can take one or more of the series of corrective actions described above.

In various embodiments, the ticket vending machine 100 regularly monitors the scan region contaminant data associated with the barcode(s) of the dispensed lottery tickets such that the ticket vending machine 100 will often be able to detect a potential lottery ticket scanning issue before the issue becomes severe enough to cause the ticket vending machine to shut down and stop dispensing lottery tickets. In various embodiments, when the ticket vending machine 100 detects a potential lottery ticket scanning issues that is severe, the controller(s) can cause the ticket vending machine to shut down and stop dispensing lottery tickets.

Various changes and modifications to the present embodiments described herein will be apparent to those skilled in the art. Such changes and modifications can be made without departing from the spirit and scope of the present subject matter and without diminishing its intended technical scope. It is therefore intended that such changes and modifications be covered by the appended claims.

The invention claimed is:

1. A lottery ticket vending machine comprising:

a housing;

a ticket drawer holder in the housing, the ticket drawer holder comprising a plurality of ticket drawers and a cleaning pad drawer, each of the plurality of ticket drawers configured to hold a plurality of lottery tickets, the cleaning pad drawer configured to hold a cleaning pad; and a ticket burster in the housing, the ticket burster configured to:

move to a cleaning pad receipt position associated with and in alignment with the cleaning pad drawer, and receive the cleaning pad from the cleaning pad drawer to clean a part of the ticket burster.

2. The lottery ticket vending machine of claim 1, wherein the ticket burster is configured to:

perform a cleaning operation of the part of the ticket burster using the cleaning pad received from the cleaning pad drawer, and cause the cleaning pad to be retracted back into the cleaning pad drawer after performing the cleaning operation.

3. The lottery ticket vending machine of claim 2, wherein the ticket burster is configured to:

move to the cleaning pad receipt position for a subsequent cleaning operation of the part of the ticket burster, receive the cleaning pad from the cleaning pad drawer for the subsequent cleaning operation of the part of the ticket burster, and perform the subsequent cleaning operation of the part of the ticket burster; and cause the cleaning pad to be retracted back into the cleaning pad drawer after the subsequent cleaning operation of the part of the ticket burster.

4. The lottery ticket vending machine of claim 2, wherein the cleaning operation comprises a forward and backward movement of the cleaning pad through the part of the ticket burster.

5. The lottery ticket vending machine of claim 1, wherein the cleaning pad drawer is configured to hold a plurality of cleaning pads, and wherein the ticket burster is configured to cause the cleaning pad to be separated from a next cleaning pad of the plurality of cleaning pads, to move the cleaning pad through the ticket burster to clean the part of the ticket burster, and to eject the cleaning pad out of a ticket outlet of the ticket burster.

6. The lottery ticket vending machine of claim 5, wherein the ticket burster is configured to move the cleaning pad in a forward and backward movement through the part of the ticket burster before ejecting the cleaning pad.

7. The lottery ticket vending machine of claim 1, wherein the lottery ticket vending machine further comprises a controller configured to cause the ticket burster to perform a cleaning operation of the part of the ticket burster using the cleaning pad received from the cleaning pad drawer based on one of: a time interval and a time of day.

8. The lottery ticket vending machine of claim 1, wherein the lottery ticket vending machine further comprises a controller configured to cause the ticket burster to perform a cleaning operation of the part of the ticket burster using the cleaning pad received from the cleaning pad drawer based on a quantity of lottery tickets dispensed from the lottery ticket vending machine.

9. The lottery ticket vending machine of claim 1, wherein the lottery ticket vending machine comprises a controller configured to determine a presence of contaminants at the part of the ticket burster and to cause the ticket burster to perform the cleaning operation responsive to the determined presence of the contaminants.

10. A lottery ticket vending machine comprising:

a housing;

a ticket drawer holder in the housing, the ticket drawer holder comprising a plurality of ticket drawers and a cleaning pad drawer, each of the plurality of ticket drawers configured to hold a plurality of lottery tickets, the cleaning pad drawer configured to hold a cleaning pad; and a ticket burster in the housing, the ticket burster:

defining a ticket inlet, a scan region, and a ticket outlet, comprising a barcode reader configured to read barcode data based on barcodes of lottery tickets that move into the ticket burster via the ticket inlet and through the scan region, movable to a plurality of different ticket receipt positions, each of the plurality of different ticket receipt positions associated with and in alignment with a different one of the plurality of ticket drawers, and configured to:

receive in each of the plurality of different ticket receipt positions and via the ticket inlet a lottery ticket attached to a next lottery ticket from the ticket drawer associated with that ticket receipt position, separate the lottery ticket from the next lottery ticket, move the lottery ticket through the scan region, and dispense the lottery ticket via the ticket outlet, move to a cleaning pad receipt position associated with and in alignment with the cleaning pad drawer, receive in the cleaning pad receipt position and via the ticket inlet the cleaning pad from the cleaning pad drawer, and perform a cleaning operation to clean the scan region by moving the cleaning pad through the scan region.

11. The lottery ticket vending machine of claim 10, wherein the ticket burster is configured to:

cause the cleaning pad to be retracted back into the cleaning pad drawer after performing the cleaning operation, move to the cleaning pad receipt position for a subsequent cleaning operation of the scan region of the ticket burster, receive the cleaning pad from the cleaning pad drawer for the subsequent cleaning operation of the scan region of the ticket burster, perform the subsequent cleaning operation of the scan region of the ticket burster, and cause the cleaning pad to be retracted back into the cleaning pad drawer after the subsequent cleaning operation of the scan region of the ticket burster.

12. The lottery ticket vending machine of claim 10, wherein the lottery ticket vending machine comprises a controller configured to cause the ticket burster to perform the cleaning operation of the scan region of the ticket burster using the cleaning pad received from the cleaning pad drawer based on one of: a time interval, a time of day, and a quantity of lottery tickets dispensed from the lottery ticket vending machine.

13. The lottery ticket vending machine of claim 10, wherein the lottery ticket vending machine comprises a controller configured to determine a presence of contaminants at the scan region of the ticket burster and to cause the ticket burster to perform the cleaning operation responsive to the determined presence of the contaminants.

14. The lottery ticket vending machine of claim 10, wherein the cleaning pad comprises a fiber mesh.

15. A lottery ticket vending machine comprising:

a housing;

a ticket drawer holder in the housing, the ticket drawer holder comprising a plurality of ticket drawers and a cleaning pad drawer, each of the plurality of ticket drawers configured to hold a plurality of lottery tickets, the cleaning pad drawer configured to hold a plurality of cleaning pads; and a ticket burster in the housing, the ticket burster:

defining a ticket inlet, a scan region, and a ticket outlet, comprising a barcode reader configured to read barcode data based on barcodes of lottery tickets that move into the ticket burster via the ticket inlet and through the scan region, movable to a plurality of different ticket receipt positions, each of the plurality of different ticket receipt positions associated with and in alignment with a different one of the plurality of ticket drawers, and configured to:

receive in each of the plurality of different ticket receipt positions and via the ticket inlet a lottery ticket attached to a next lottery ticket from the ticket drawer associated with that ticket receipt position, separate the lottery ticket from the next lottery ticket, move the lottery ticket through the scan region, and dispense the lottery ticket via the ticket outlet, move to a cleaning pad receipt position associated with and in alignment with the cleaning pad drawer, receive in the cleaning pad receipt position and via the ticket inlet a cleaning pad from the cleaning pad drawer, cause the cleaning pad to be separated from a next cleaning pad of the plurality of cleaning pads, perform a cleaning operation to clean the scan region by moving the cleaning pad through the scan region, and move the cleaning pad out of the ticket burster via the ticket outlet.

16. The lottery ticket vending machine of claim 15, wherein the ticket burster is configured to cause the next cleaning pad to be retracted back into the cleaning pad drawer after separating the cleaning pad from the next cleaning pad.

17. The lottery ticket vending machine of claim 15, wherein the ticket burster is configured to:

move to the cleaning pad receipt position for a subsequent cleaning operation of the scan region of the ticket burster, receive the next cleaning pad from the cleaning pad drawer for the subsequent cleaning operation of the scan region of the ticket burster, perform the subsequent cleaning operation of the scan region of the ticket burster using the next cleaning pad, and move the next cleaning pad out of the ticket burster via the ticket outlet after the subsequent cleaning operation of the scan region of the ticket burster.

18. The lottery ticket vending machine of claim 15, wherein the lottery ticket vending machine comprises a controller configured to cause the ticket burster to perform the cleaning operation of the scan region of the ticket burster using the cleaning pad received from the cleaning pad drawer based on: one of a time interval, a time of day, and a quantity of lottery tickets dispensed from the lottery ticket vending machine.

19. The lottery ticket vending machine of claim 15, wherein the lottery ticket vending machine comprises a controller configured to determine a presence of contaminants at the scan region of the ticket burster and to cause the ticket burster to perform the cleaning operation responsive to the determined presence of the contaminants.

20. The lottery ticket vending machine of claim 15, wherein the cleaning pad comprises a fiber mesh.

* * * * *